United States Patent
McElfresh et al.

(10) Patent No.: US 8,306,311 B2
(45) Date of Patent: Nov. 6, 2012

(54) METHOD AND SYSTEM FOR AUTOMATED BALL-GRID ARRAY VOID QUANTIFICATION

(75) Inventors: David K. McElfresh, San Diego, CA (US); Anton A. Bougaev, La Jolla, CA (US); Aleksey Urmanov, La Jolla, CA (US)

(73) Assignee: Oracle International Corporation, Redwood City, CA (US)

(*) Notice: Subject to any disclaimer, the term of this patent is extended or adjusted under 35 U.S.C. 154(b) by 454 days.

(21) Appl. No.: 12/759,960

(22) Filed: Apr. 14, 2010

(65) Prior Publication Data

US 2011/0255768 A1 Oct. 20, 2011

(51) Int. Cl.
*G06K 9/00* (2006.01)
(52) U.S. Cl. ............. 382/145; 356/237.1; 356/237.6; 382/141
(58) Field of Classification Search .......... 382/145, 382/141; 356/237.1–237.5
See application file for complete search history.

(56) References Cited

U.S. PATENT DOCUMENTS

| | | | | |
|---|---|---|---|---|
| 5,291,535 A | * | 3/1994 | Baker et al. | 378/22 |
| 5,963,662 A | * | 10/1999 | Vachtsevanos et al. | 382/150 |
| 6,201,892 B1 | * | 3/2001 | Ludlow et al. | 382/149 |
| 7,013,038 B1 | * | 3/2006 | Patnaik | 382/145 |
| 2005/0105682 A1 | * | 5/2005 | Heumann et al. | 378/58 |

* cited by examiner

*Primary Examiner* — Gregory J Toatley
*Assistant Examiner* — Isiaka Akanbi
(74) *Attorney, Agent, or Firm* — Brooks Kushman P.C.

(57) ABSTRACT

A method and system for identifying voids in solder balls in a ball-grid array (BGA) using an image of the BGA include localizing an image of a solder ball on the BGA image, the solder ball image having a radius and having multiple points each having an image intensity, and producing a void-free model image of the solder ball based on the radius of the solder ball image, the void-free model image having multiple points each having an image intensity. The method and system also include computing a difference between the image intensities of the points of the solder ball image and the image intensities of the points of the void-free model image to produce a residual image, and identifying a void using the residual image.

20 Claims, 5 Drawing Sheets

METHOD AND SYSTEM FOR AUTOMATED BALL-GRID ARRAY VOID QUANTIFICATION

TECHNICAL FIELD

The following relates to systems and methods for automated quantification of voids in solder balls in a ball-grid array.

BACKGROUND

The development of voids in solder balls in ball-grid array (BGA) assembly of electrical components is a significant problem in that it can have great impact on the reliability of the joints formed with such solder balls, and hence on the performance of such components. Void development, or "voiding," in solder balls in a BGA may be introduced during board-level electrical component assembly.

X-ray radiation remains the preferred method for solder-joint inspection to detect, and thus permit action to correct or manage, such voiding. Current systems for solder-joint inspection take advantage of high-resolution X-ray technology.

In that regard, X-ray solder-joint inspection provides gray-scale images which represent variances in the shape and thickness of a solder ball. Low density features such as voids produce lighter images than those of higher density or thickness, making it possible to quantitatively measure void volumes or void fractions. By accumulating void volume measurement data for several BGA assemblies, variations in the manufacturing process can be identified and corrected before anomalous conditions cause defects.

Current BGA inspection methods are mostly manual. Manual methods are generally superior to automated methods as far as accuracy in identifying voids. However, while superior in identifying voids, manual methods are time consuming, thus making such methods impractical for volume production inspection processes.

Current automated tools for estimating BGA void fractions are also problematic. Such tools are fairly crude, and therefore are often inaccurate or produce inconsistent results. Most automated tools use the "grey scale value" of pixels to identify voids and to estimate the area, where "brighter" pixels indicate voids. However, some areas that in fact are not voids are inaccurately identified as voids because they have brightness values that coincide with the brightness values assigned to voids. Moreover, voids may be too small for existing tools to detect, and those tools can also fail to clearly define void edges. As a result, the extent of voiding in a BGA assembly may be underestimated or overestimated.

Currently deployed systems for quantifying void volumes in BGA assembly solder balls also suffer from a number of deficiencies. More specifically, the number of parameters to be fitted for locating voids is large, and therefore may exceed the number of measurements available. This may result in systems of equations being ill-conditioned and often inconsistent, leading to slow or no convergence and artifacts in the fitted models.

Accounting for additional information, constraints and prior knowledge can also be difficult or impossible to express mathematically in common representations. As well, incorporating certain types of information, such as the fact that BGA assembly solder balls are approximately spherical with diameters falling predominantly in a narrow range and that the spacing between joints is known in advance, into a low-level representation is difficult and inefficient.

Moreover, as with manual void identification, manual void volume estimation undertaken by an operator using a cursor to measure the diameter of a void versus the diameter of a solder ball is inherently slow. Such manual estimation can also have low accuracy.

Still further, void volume quantification systems rely on various assumptions. These can include the types of voids, such as voids occurring within a solder ball or at an interface, as well as the spherical shape of voids. These assumptions can be incorrect, thereby leading to inaccurate estimations of void volumes or void fractions.

There is therefore a need for a method and system for automated BGA void volume quantification directed to many of the above-mentioned deficiencies. Such an automated method and system would address various speed, cost and quality issues associated with current manual and/or automated inspection and estimation methods.

SUMMARY

According to one embodiment disclosed herein, a method is provided for identifying voids in solder balls in a ball-grid array (BGA) using an image of the BGA. The method comprises localizing an image of a solder ball on the BGA image, the solder ball image having a radius and comprising a plurality of points, each point having an image intensity, and producing a void-free model image of the solder ball based on the radius of the solder ball image, the void-free model image comprising a plurality of points, each point having an image intensity. The method further comprises computing a difference between the image intensities of the points of the solder ball image and the image intensities of the points of the void-free model image to produce a residual image, the residual image comprising a plurality of points, each point having an image intensity, and identifying a void using the residual image.

According to another embodiment, a system is provided for identifying voids in solder balls in a ball-grid array (BGA) using an image of the BGA. The system comprises a controller configured to localize an image of a solder ball on the BGA image, the solder ball image having a radius and comprising a plurality of points, each point having an image intensity, and to produce a void-free model image of the solder ball based on the radius of the solder ball image, the void-free model image comprising a plurality of points, each point having an image intensity. The controller is further configured to compute a difference between the image intensities of the points of the solder ball image and the image intensities of the points of the void-free model image to produce a residual image, the residual image comprising a plurality of points, each point having an image intensity, and to identify a void using the residual image. The system further comprises an output device configured to output data representing the identified void.

According to a further embodiment, a storage medium having computer executable instructions recorded thereon is provided for identifying voids in solder balls in a ball-grid array (BGA) using an image of the BGA. The computer executable instructions comprise instructions for localizing an image of a solder ball on the BGA image, the solder ball image having a radius and comprising a plurality of points, each point having an image intensity, and for producing a void-free model image of the solder ball based on the radius of the solder ball image, the void-free model image comprising a plurality of points, each point having an image intensity. The computer executable instructions further comprise instructions for computing a difference between the image intensities of the points of the solder ball image and the image intensities of the points of the void-free model image to produce a residual image, the residual image comprising a plurality of points, each point having an image intensity, for identifying a void using the residual image, and for outputting data representing the identified void.

A detailed description of these embodiments and accompanying drawings is set forth below.

DETAILED DESCRIPTION

With reference to FIGS. 1-6, a method and system for automated quantification of void volumes in solder balls in a ball-grid array (BGA) will be described. As an exemplary application, the method and system may be used in industrial imaging with BGA void volume quantification for automated inspection. In general, R-functions may be utilized to create compact representations of various regions of imaged objects and to perform analytical manipulations of the regions. This allows for computation of desired characteristics of imaged objects with high fidelity.

The method and system for BGA void volume quantification disclosed herein generally comprises three main stages. These include localization of solder balls in an image of the BGA, which may be an X-ray image, applying X-ray attenuation with a matter model to individual solder balls, and localizing voids in the residual image of a solder ball and computing void volumes.

Figure 1:
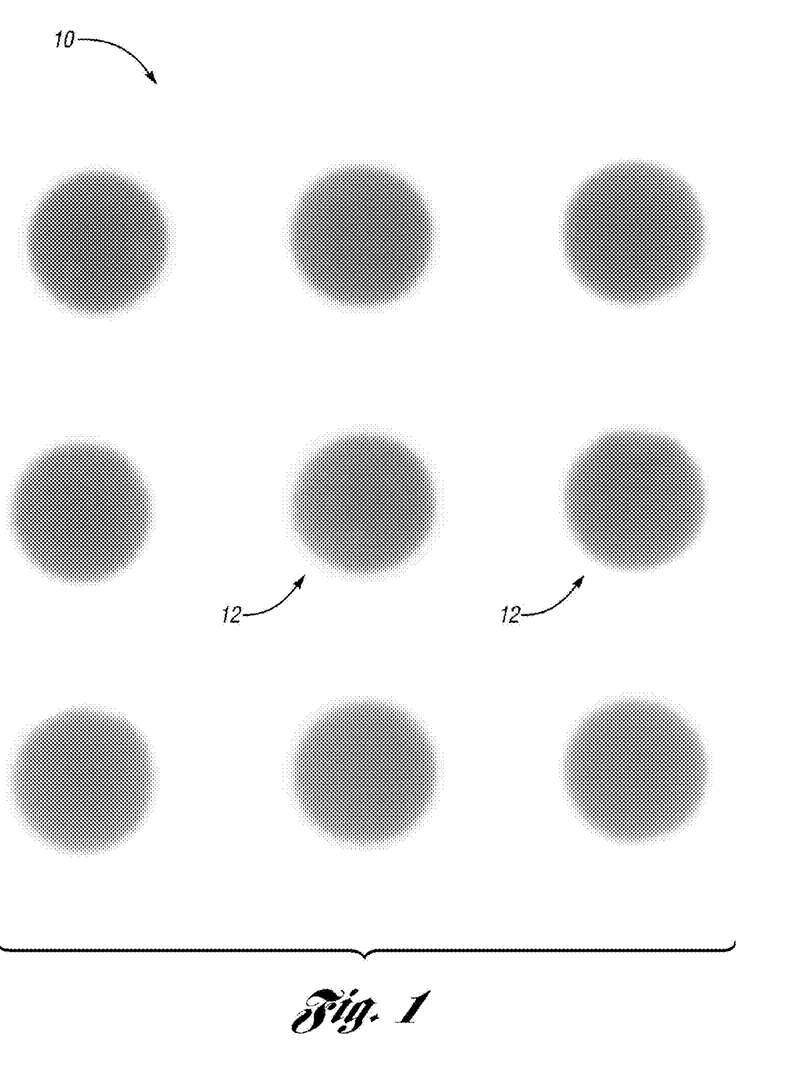
FIG. 1 is an X-ray image of a ball-grid array of solder balls, such as may be used in the assembly of electrical components on a printed circuit board.

More specifically, with respect to localization of solder balls in a BGA image, FIG. 1 is an X-ray image (10) of a ball-grid array of solder balls, such as may be used in the assembly of electrical components on a printed circuit board. The image (10) of FIG. 1 is an exemplary X-ray capture of a grid of solder balls (12). While the FIG. 1 image (10) shows nine solder balls (12), it should be noted that the method and system described herein may be used with BGA images of any number of solder balls. It should also be noted that while FIG. 1 is an exemplary image produced by X-ray radiation, other forms of radiation could also be used.

Prior to localizing solder balls (12) on the image, preprocessing may be performed on the image (10) to remove labels, text marks, lines and other drawings superimposed on the image (10) by the x-ray imaging equipment during the image generation. This operation can be performed in various ways known to those skilled in the art, with thresholding as an exemplary embodiment. Indeed, since such labels, notes, lines and other marks on the image (10) are made using a known intensity on gray-scale images, thresholding may be employed very effectively for their removal from the image (10).

After such labels and notes have been cleared from the image (10), localizing individual solder balls (12) in the image (10) may be undertaken. In that regard, with the X-ray image (10) as an input, an algorithm may be employed to provide a list of solder ball centers and radii. More specifically, an image minimum intensity, denoted $I_{min}$, and an image maximum intensity, denoted $I_{max}$, are first computed. The image (10) is then scanned and a list is composed of points of intensity change in excess of $(k)*(I_{max}-I_{min})$. It should be noted here that the image (10) may be scanned in any systematic or methodical fashion, such as, for example, row-by-row or column-by-column. It should also be noted that the factor, k, applied to the difference between the image maximum and image minimum intensities to identify a list of image points is a constant, such as 0.9, that is selected empirically and may be adjusted as necessary.

Figure 2:
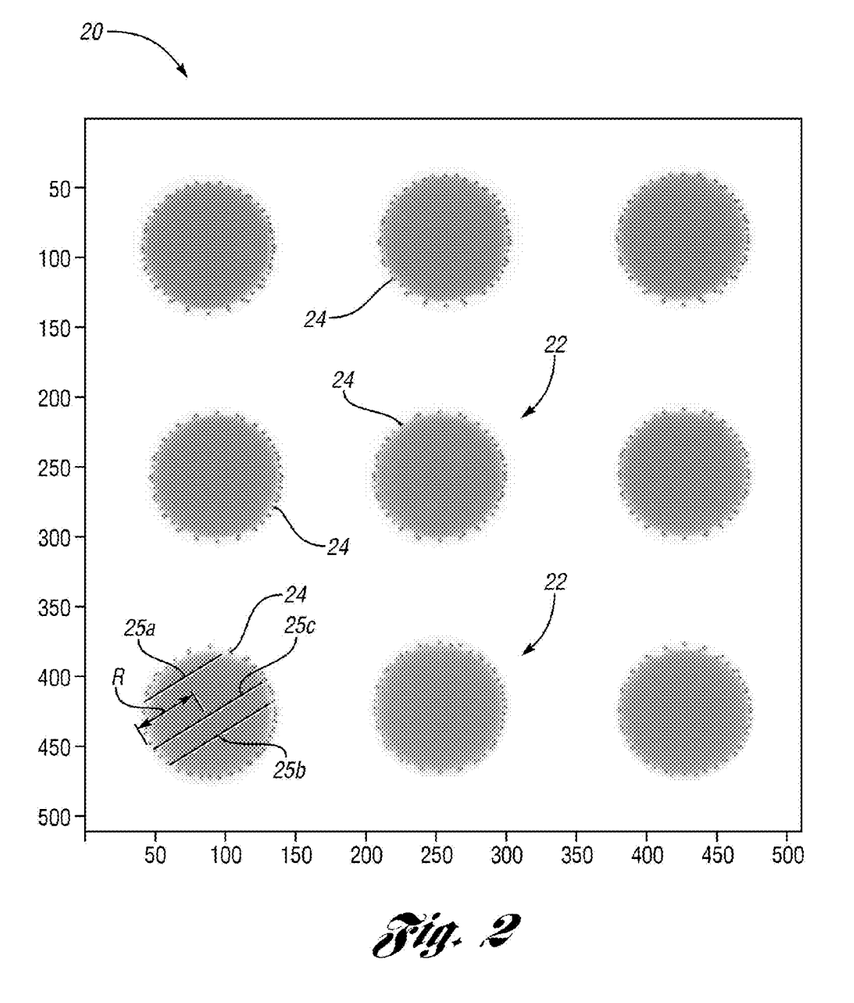
FIG. 2 is the X-ray image of FIG. 1 with labels and lines removed, and with solder ball locations and radii detected.

The points identified in this fashion are known to lie on the boundary of individual solder ball images (12). In that regard, FIG. 2 shows the X-ray image of FIG. 1 with labels and lines removed, and with solder ball locations and radii detected as described herein. The image (20) of FIG. 2 shows individual localized solder balls (22) with points (24) outlining the identified boundaries of the solder balls (22).

Moreover, the list of points (24) may be compiled in such a way that each pair of points represents a chord (25a, 25b, 25c) of a substantially circular image portion representing a solder ball. The length of such chords is then computed in terms of the number of pixels from the image (the co-ordinate axes in FIG. 2 denote pixel numbers). The longest chord (25c) gives an approximate estimate of the radius of the solder balls in the BGA, denoted R. The list of chords may then be split into subsets of chords whose centers lie within (p)*R. Here again, it should be noted that the factor, p, applied to the estimated radius, R, of the solder balls to identify chord subsets is a constant, such as 0.2, that is selected empirically and may be adjusted as necessary.

The number of chord subsets thus identified is equal to the number of balls in the image. The chords of each subset are then used to estimate with high accuracy the centers of the individual solder balls and the radius of each solder ball. This may be accomplished by taking the mean of the centers of the chords in a subset as the ball center.

The above-described processing provides a list of solder ball centers and radii. The image may then be split to isolate the individual solder balls in order to perform a search for voids in each individual ball. It should be noted, however, that the individual balls are cut from the image for convenience only. That is, the operations described herein may be implemented on the original BGA image without cutting that portion of the image containing an individual solder ball from the image as a whole.

Following such processing, X-ray attenuation is then applied to individual localized solder balls. In that regard, X-ray imaging uses penetrating X-ray radiation. Solder joints typically contain lead, tin, or both, and highly attenuate such radiation. Indeed, solder balls with thicknesses of only several millimeters can attenuate more than 99% of incoming X-ray photons.

To describe the intensity of model images representing the solder balls, an exponential attenuation model, $I/I_o = e^{-\lambda x}$, may be assumed. In this equation, $I_o$ represents the original intensity of the X-ray radiation, I represents the attenuated intensity of the X-ray radiation, $\lambda$ represents an X-ray linear attenuation coefficient based on the material of the solder ball, and x represents the distance traveled by the X-ray radiation through the solder ball.

It should be noted here that the effects related to the attenuation coefficient, λ, may not be constant in the typical energy range of 10 to 160 keV for emitting X-rays. The effective spectrum may also change as radiation at some energies is preferentially absorbed or scattered as the beam passes further into the sample. As well, some X-rays may be deflected during propagation through a sample, both elastically and inelastically. Any or all of these factors can be taken into account empirically if found to have a significant effect on the resulting calculation.

Figure 3:
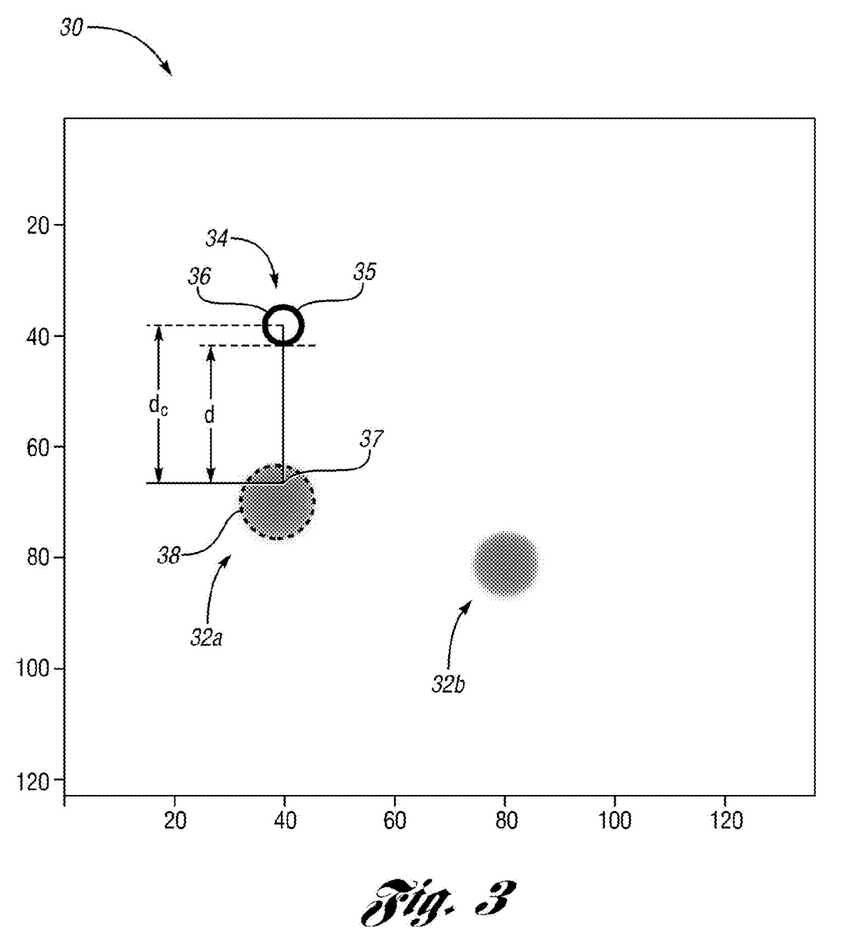
FIG. 3 is an illustration of locating voids in a residual image according to one embodiment of a method and system for identifying voids in solder balls in a ball-grid array.

The void-free model image of a solder ball produced in such a fashion may then be subtracted from the actual image of the ball. More specifically, a difference between the image intensities of the points of the solder ball image and the image intensities of the points of the void-free model image may be computed, resulting in a residual image that represents voids and possibly other defects in the ball. In that regard, exemplary residual images are shown in FIGS. 3 and 4.

Thereafter, using such residual images, voids may be localized and void fractions and/or void volumes computed. In this stage, voids are automatically computed in the residual images of balls and void volumes or fractions are computed using analytical models of the voids in the ball.

Figure 4:
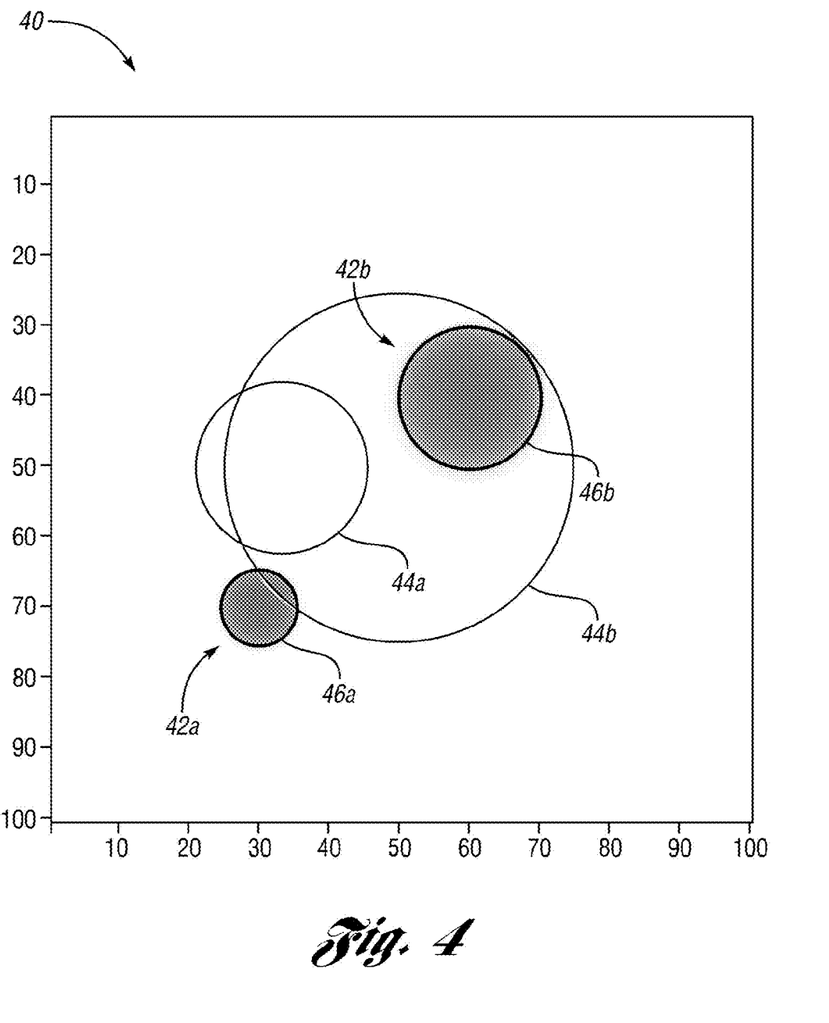
FIG. 4 is an illustration of identifying voids within a solder ball according to another embodiment of a method and system for identifying voids in solder balls in a ball-grid array.

In that regard, FIG. 4 is an illustration of capturing voids within a solder ball using such an analytical model according to an embodiment of a method and system for identifying voids in solder balls. More specifically, the following problem is mathematically formulated and solved:

$$\text{Min } \Sigma A_i, \text{ subject to: } [\wedge_n V_i c(x_i, y_i, x_n, y_n, r_i) < 0] > 0$$

In the above equation, $A_i$ represents the area of a circle, i, represented by center, $(x_i, y_i)$, and radius, $r_i$. Further, c represents a function relating to a sphere known in the art, and $(x_n, y_n)$ represents a set of residual image points (i.e., image pixels) having image intensities differing from a threshold intensity (e.g., a background intensity). In that regard, voids in the residual image have lower intensity than the intensity of the solder ball. The solder ball intensity, or more precisely what is left from the ball after subtracting the model image as described above, becomes background intensity. Finally, $\wedge_n$ represents an R-disjunction operation and $V_i$ represents an R-conjunction operation, operations which are known to those skilled in the art. In that regard, U.S. Pat. No. 7,660,775 entitled "Method And Apparatus For Classifying Data Using R-Functions" is hereby incorporated by reference.

As is readily apparent to those of ordinary skill in the art, the above problem seeks to minimize the area of all circles subject to all non-background pixels lying in at least one of the circles (the meaning of the constraint). This is a constrained optimization problem with nonlinear constraints which may be solved in various fashions known in the field of optimization.

As noted, in the above equation, c represents a function known in the art relating to a sphere. However, the void quantification technique described may be employed to locate and quantify voids of any other shape, such as elliptical or other shapes, with the above equation adjusted to include functions known in the art relating to such other shapes.

As seen in FIG. 4, a residual image (40) of a single solder ball with two circular voids (42a, 42b) is shown. According to the technique described, two initial condition circles (44a, 44b) are generated, or "dropped," on the image (40). Optimization according to the above-described equation results in circles (46a, 46b) that capture the voids (42a, 42b). The areas of circles (46a, 46b) may then be used to compute void fractions based on the area of the solder ball image (22) (see FIG. 2). More specifically, a void fraction, $V_{Fraction}$, which may be expressed as a percentage, may be computed according to the equation $V_{Fraction} = V_{Area} \div Ball_{Area}$, where $V_{Area}$ is the area of a void circle (46a, 46b), and $Ball_{Area}$ is the area of the solder ball image circle (22). A void volume may also be computed based on the radius of the circles (46a, 46b) resulting from the optimization process.

It should be noted here that the location and number of initial condition circles (44a, 44b) can be random. That is, initial condition circles (44a, 44b) may be generated anywhere inside image (40). As well, any number of initial condition circles (44a, 44b) may be generated because, given the optimization technique described, all such circles will collapse or overlap with optimized circles (46a, 46b). In that regard, while an operator could be given discretion to determine the number and/or locations of initial condition circles (44a, 44b), such manual interaction is not necessary. For example, because there are usually less than 10 voids or other defects in a typical solder ball, a default number of 10 initial condition circles (44a, 44b) could be automatically generated at random locations in the image (40).

Next, FIG. 3 illustrates locating voids in a residual image using another analytical model according to an embodiment of a method and system for identifying voids in solder balls. According to this embodiment, another problem may be mathematically formulated which allows for locating voids one by one. More specifically, the problem seeks to optimize the following cost function:

$$\text{Min } E = \Sigma(|d_c| \cdot \char`\^ A) - \Sigma(d(\text{find}(d<0)) \cdot \char`\^ B)$$

In the above equation, for a selected model circle (34) having a center (35) and an edge (36), $d_c$ represent a distance from a residual image point (37) to the center (35) of the model circle (34) and d represent a distance from a residual image point (37) to the edge (36) of the model circle (34), wherein d is negative in value for a residual image point lying inside the model circle (34) and positive in value for a residual image point lying outside the model circle (34), and such distances are expressed in terms of a number of image pixels. As well, A and B are selected constants which may have the values 0.1 and 0.01, respectively. In that regard, it should be noted that the values of the constants A and B are determined empirically, and may be adjusted as necessary. Once again, this optimization problem may be solved in any manner known in the filed of optimization.

As seen in FIG. 3, a residual image (30) of a single solder ball with two circular voids (32a, 32b) is shown. According to the technique described, a model circle (34) is generated on the image (30). Optimization according to the above-described equation results in circle (38) that captures one of the voids (32a). As previously described, the area of the circle (38) may then be used to compute a void fraction based on the area of the solder ball image (22) (see FIG. 2). More specifically, a void fraction, $V_{Fraction}$, may be computed according to the equation $V_{Fraction} = V_{Area} Ball_{Area}$, where $V_{Area}$ is the area of the circle (38), and $Ball_{Area}$ is the area of the solder ball image circle (22). A void volume may also be computed based on the radius of the circle (38) resulting from the optimization process.

Figure 5:
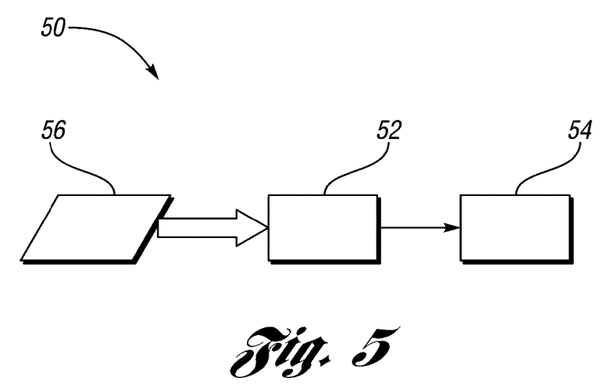
FIG. 5 is simplified, exemplary block diagram of an embodiment of a system for identifying voids in solder balls in a ball-grid array.

Referring next to FIG. 5, a simplified, exemplary block diagram of a system (50) for identifying voids in solder balls in a BGA using an image of the BGA is shown. As seen therein, and as also described above in connection with FIGS. 1-4, the system (50) comprises a controller (52) and an output device (54). The controller (50) may comprise an appropriately programmed microprocessor, micro-controller or the like, including any combination of hardware, software and/or firmware desired. As well, the output device (54) may comprise any type of display for displaying information graphically and/or textually.

As previously described, the controller (50) receives an image (56) of a BGA, which may be an image produced by X-ray or other forms of radiation. The controller (50) is configured to localize an image of a solder ball on the BGA image, the solder ball image having a radius and comprising a plurality of points, each point having an image intensity, and to produce a void-free model image of the solder ball based on the radius of the solder ball image, the void-free model image comprising a plurality of points, each point having an image intensity. The controller (50) is also configured to compute a difference between the image intensities of the points of the solder ball image and the image intensities of the points of the void-free model image to produce a residual image, the residual image comprising a plurality of points, each point having an image intensity, and to identify a void using the residual image. The output device (54) is configured to output data representing the identified void.

In that regard, as previously described, to localize an image of a solder ball on the BGA image, the controller (52) may be configured to determine an image maximum intensity and an image minimum intensity of the BGA image, and to identify image points in the BGA image where a change in an image intensity exceeds a threshold value, the threshold value based on the difference between the image maximum intensity and the image minimum intensity. To localize an image of a solder ball on the BGA image, the controller (52) may also be configured to select a plurality of pairs of identified image points, each pair of image points representing a chord of a substantially circular portion of the BGA image representing a solder ball image, to determine a length of each chord, and to determine an estimated center and an estimated radius of the solder ball image based on the chord having the greatest length.

As also described previously, to localize an image of a solder ball on the BGA image, the controller (52) may still further be configured to identify a plurality of chords, each chord having a center point located at a distance less than a threshold distance from the center point of the chord having the greatest length, wherein the threshold distance is a percentage of the estimated radius, and determining a center of the solder ball image based on the center points of the identified plurality of chords. To localizing an image of a solder ball, the controller (52) may be further configured to determine a radius of the solder ball image based on the determined center of the solder ball image. In that regard, to determine a center of the solder ball image based on the center points of the identified plurality of chords, the controller (52) may be configured to compute a mean of the center points of the identified plurality of chords and the center point of the chord having the greatest length.

As described above in connection with FIGS. 1-4, the BGA image for use according to the system (50) for identifying voids in solder balls in a BGA may be produced by X-ray imaging. In that case, to produce a void-free model image of the solder ball based on the estimated radius of the solder ball image, the controller (52) may be configured to compute a void-free model image according to the equation $I/I_o = e^{-\lambda x}$, where $I_o$ represents the original intensity of the X-ray radiation, I represents the attenuated intensity of the X-ray radiation, $\lambda$ represents an X-ray linear attenuation coefficient based on a material of the solder ball, and x represents the distance traveled by the X-ray radiation through the solder ball.

Still further, to identify a void using the residual image, the controller (52) may be configured, as previously described, to compute a void according to the equation:

$$\text{Min } \Sigma A_i, \text{ subject to: } [\wedge_n \vee_i c(x_i, y_i, x_n, y_n, r_i) < 0] > 0$$

where $A_i$ represents the area of a circle, i, represented by center, $(x_i, y_i)$, and radius, $r_i$, c represents a function relating to a sphere, $(x_n, y_n)$ represents a set of residual image points having image intensities differing from a threshold intensity, $\wedge_n$ represents an R-disjunction operation, and $\vee_i$ represents an R-conjunction operation.

Alternatively, to identify a void using the residual image, the controller (52) may be configured, as also described previously, to compute a void according to the equation:

$$\text{Min } E = \Sigma(|d_c|\cdot\hat{}A) - \Sigma(d(\text{find}(d<0))\cdot\hat{}B)$$

where, for a selected model circle having a center and an edge, $d_c$ represent a distance from a residual image point to the center of the model circle and d represent a distance from a residual image point to the edge of the model circle, wherein d is negative in value for a residual image point lying inside the model circle and positive in value for a residual image point lying outside the model circle, and where A and B are selected constants.

Figure 6:
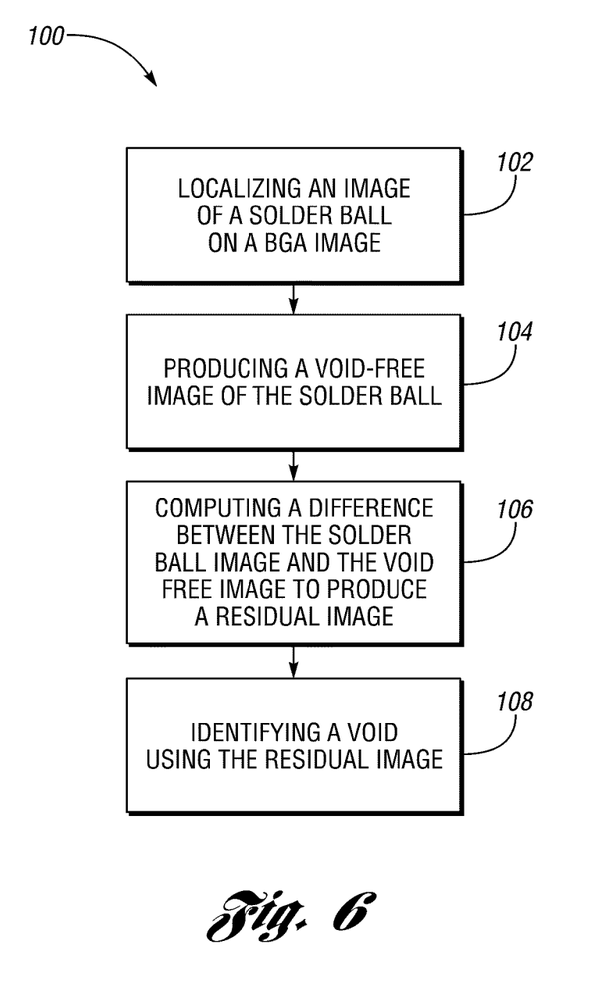
FIG. 6 is an exemplary flowchart of an embodiment of a method for identifying voids in solder balls in a ball-grid array.

Referring now to FIG. 6, an exemplary flowchart of a method (100) for identifying voids in solder balls in a BGA using an image of the BGA is shown. As seen therein, and as also described above in connection with FIGS. 1-4, the method (100) comprises localizing (102) an image of a solder ball on the BGA image, where the solder ball image has a radius and comprises a plurality of points each having an image intensity. The method (100) also comprises producing (104) a void-free model image of the solder ball based on the radius of the solder ball image, where the void-free model image comprises a plurality of points each having an image intensity.

The method (100) for identifying voids in solder balls in a BGA further comprises computing (106) a difference between the image intensities of the points of the solder ball image and the image intensities of the points of the void-free model image to produce a residual image, where the residual image comprises a plurality of points each having an image intensity. The method (100) still further comprises identifying (108) a void using the residual image.

In that regard, as previously described, localizing (102) an image of a solder ball on the BGA image may comprise determining an image maximum intensity and an image minimum intensity of the BGA image, and identifying image points in the BGA image where a change in an image intensity exceeds a threshold value, the threshold value based on the difference between the image maximum intensity and the image minimum intensity. Localizing (102) an image of a solder ball on the BGA image may further comprise selecting a plurality of pairs of identified image points, each pair of image points representing a chord of a substantially circular portion of the BGA image representing a solder ball image, determining a length of each chord, and determining an estimated center and an estimated radius of the solder ball image based on the chord having the greatest length.

As also described previously, localizing (102) an image of a solder ball on the BGA image may still further comprise identifying a plurality of chords, each chord having a center point located at a distance less than a threshold distance from the center point of the chord having the greatest length, wherein the threshold distance is a percentage of the estimated radius, and determining a center of the solder ball image based on the center points of the identified plurality of chords. Localizing (102) may further comprise determining a radius of the solder ball image based on the determined center of the solder ball image. In that regard, determining a center of the solder ball image based on the center points of the identified plurality of chords may comprise computing a mean of the center points of the identified plurality of chords and the center point of the chord having the greatest length.

As described above in connection with FIGS. 1-4, the BGA image for use according to the method (100) for identifying voids in solder balls in a BGA may be produced by X-ray imaging. In that case, producing (104) a void-free model image of the solder ball based on the estimated radius of the solder ball image may comprise computing a void-free model image according to the equation $I/I_o = e^{-\lambda x}$, where $I_o$ represents the original intensity of the X-ray radiation, I represents the attenuated intensity of the X-ray radiation, $\lambda$ represents an X-ray linear attenuation coefficient based on a material of the solder ball, and x represents the distance traveled by the X-ray radiation through the solder ball.

Still further, identifying (108) a void using the residual image may comprise, as previously described, computing a void according to the equation:

$$\text{Min } \Sigma A_i, \text{ subject to: } [\wedge_n \vee_i c(x_i, y_i, x_n, y_n, r_i) < 0] > 0$$

where $A_i$ represents the area of a circle, i, represented by center, $(x_i, y_i)$, and radius, $r_i$, c represents a function relating to a sphere, $(x_n, y_n)$ represents a set of residual image points having image intensities differing from a threshold intensity, $\wedge_n$ represents an R-disjunction operation, and $\vee_i$ represents an R-conjunction operation.

Alternatively, identifying (108) a void using the residual image may comprise, as also described previously, computing a void according to the equation:

$$\text{Min } E = \Sigma(|d_c| \hat{\,} A) - \Sigma(d(\text{find}(d<0)) \hat{\,} B)$$

where, for a selected model circle having a center and an edge, $d_c$ represent a distance from a residual image point to the center of the model circle and d represent a distance from a residual image point to the edge of the model circle, wherein d is negative in value for a residual image point lying inside the model circle and positive in value for a residual image point lying outside the model circle, and where A and B are selected constants.

It should be understood that the order of the steps of the method (100) shown in FIG. 6 and described herein is exemplary only. In that regard, the steps of the method (100) may performed in orders or combinations other than those specifically shown and described, including simultaneously.

As can be seen, the foregoing describes a method and system for automated BGA void volume quantification that addresses various speed, cost and quality issues associated with current manual and/or automated inspection and estimation methods. In that regard, the method and system described expand automated X-ray inspecting technology and minimize human involvement to enable automated X-ray inspection and void volume computation for manufacturing process monitoring and corrective action indication.

While certain embodiments have been illustrated and described, it is not intended that these embodiments illustrate and describe all those possible. Rather, the words used herein are words of description rather than limitation, and it is understood that various changes may be made without departing from the spirit and scope of the following claims.

What is claimed is:

1. A method for identifying voids in solder balls in a ball-grid array (BGA) using an image of the BGA, the method comprising:

localizing an image of a solder ball on the BGA image, the solder ball image having a radius and comprising a plurality of points, each point having an image intensity;

producing a void-free model image of the solder ball based on the radius of the solder ball image, the void-free model image comprising a plurality of points, each point having an image intensity;

computing a difference between the image intensities of the points of the solder ball image and the image intensities of the points of the void-free model image to produce a residual image, the residual image comprising a plurality of points, each point having an image intensity; and identifying a void using the residual image.

2. The method of claim 1 wherein localizing an image of a solder ball on the BGA image comprises:

determining an image maximum intensity and an image minimum intensity of the BGA image;

identifying image points in the BGA image where a change in an image intensity exceeds a threshold value, the threshold value based on the difference between the image maximum intensity and the image minimum intensity;

selecting a plurality of pairs of identified image points, each pair of image points representing a chord of a substantially circular portion of the BGA image representing a solder ball image;

determining a length of each chord; and determining an estimated center and an estimated radius of the solder ball image based on the chord having the greatest length.

3. The method of claim 2 further comprising:

identifying a plurality of chords, each chord having a center point located at a distance less than a threshold distance from the center point of the chord having the greatest length, wherein the threshold distance is a percentage of the estimated radius;

determining a center of the solder ball image based on the center points of the identified plurality of chords; and determining a radius of the solder ball image based on the determined center of the solder ball image.

4. The method of claim 3 wherein determining a center of the solder ball image based on the center points of the identified plurality of chords comprises computing a mean of the center points of the identified plurality of chords and the center point of the chord having the greatest length.

5. The method of claim 1 wherein the BGA image is produced by X-ray imaging, and producing a void-free model image of the solder ball based on the estimated radius of the solder ball image comprises computing a void-free model image according to the equation:

$$I/I_o = e^{-\lambda x}$$

where $I_o$ represents the original intensity of the X-ray radiation; I represents the attenuated intensity of the X-ray radiation; $\lambda$ represents an X-ray linear attenuation coefficient based on a material of the solder ball; and x represents the distance traveled by the X-ray radiation through the solder ball.

6. The method of claim 1 wherein identifying a void using the residual image comprises computing a void according to the equation:

$$\text{Min } \Sigma A_i, \text{ subject to: } [\wedge_n \vee_i c(x_i, y_i, x_n, y_n, r_i) < 0] > 0$$

where $A_i$ represents the area of a circle, i, represented by center, $(x_i, y_i)$, and radius, $r_i$; c represents a function relating to a sphere; $(x_n, y_n)$ represents a set of residual image points having image intensities differing from a threshold intensity; $\Lambda_n$ represents an R-disjunction operation; and $V_i$ represents an R-conjunction operation.

7. The method of claim 1 wherein identifying a void using the residual image comprises computing a void according to the equation:

$$\text{Min } E = \Sigma(|d_c|\cdot\hat{}A) - \Sigma(d(\text{find}(d<0))\cdot\hat{}B)$$

where, for a selected model circle having a center and an edge, $d_c$ represent a distance from a residual image point to the center of the model circle and d represent a distance from a residual image point to the edge of the model circle, wherein d is negative in value for a residual image point lying inside the model circle and positive in value for a residual image point lying outside the model circle; and where A and B are selected constants.

8. A system for identifying voids in solder balls in a ball-grid array (BGA) using an image of the BGA, the system comprising:
  a controller configured to
    localize an image of a solder ball on the BGA image, the solder ball image having a radius and comprising a plurality of points, each point having an image intensity,
    produce a void-free model image of the solder ball based on the radius of the solder ball image, the void-free model image comprising a plurality of points, each point having an image intensity,
    compute a difference between the image intensities of the points of the solder ball image and the image intensities of the points of the void-free model image to produce a residual image, the residual image comprising a plurality of points, each point having an image intensity, and
    identify a void using the residual image; and
  an output device configured to output data representing the identified void.

9. The system of claim 8 wherein, to localize an image of a solder ball on the BGA image, the controller is configured to:
  determine an image maximum intensity and an image minimum intensity of the BGA image;
  identify image points in the BGA image where a change in an image intensity exceeds a threshold value, the threshold value based on the difference between the image maximum intensity and the image minimum intensity;
  select a plurality of pairs of identified image points, each pair of image points representing a chord of a substantially circular portion of the BGA image representing a solder ball image;
  determine a length of each chord; and
  determine an estimated center and an estimated radius of the solder ball image based on the chord having the greatest length.

10. The system of claim 9 wherein the controller is further configured to:
  identify a plurality of chords, each chord having a center point located at a distance less than a threshold distance from the center point of the chord having the greatest length, wherein the threshold distance is a percentage of the estimated radius;
  determine a center of the solder ball image based on the center points of the identified plurality of chords; and
  determine a radius of the solder ball image based on the determined center of the solder ball image.

11. The system of claim 10 wherein, to determine a center of the solder ball image based on the center points of the identified plurality of chords, the controller is configured to compute a mean of the center points of the identified plurality of chords and the center point of the chord having the greatest length.

12. The system of claim 8 wherein the BGA image is produced by X-ray imaging and, to produce a void-free model image of the solder ball based on the estimated radius of the solder ball image, the controller is configured to compute a void-free model image according to the equation:

$$I/I_o = e^{-\lambda x}$$

where $I_o$ represents the original intensity of the X-ray radiation; I represents the attenuated intensity of the X-ray radiation; $\lambda$ represents an X-ray linear attenuation coefficient based on a material of the solder ball; and x represents the distance traveled by the X-ray radiation through the solder ball.

13. The system of claim 8 wherein, to identify a void using the residual image, the controller is configured to compute a void according to the equation:

$$\text{Min } \Sigma A_i, \text{ subject to: } [\Lambda_n V_i c(x_i,y_i,x_n,y_n,r_i)<0]>0$$

where $A_i$ represents the area of a circle, i, represented by center, $(x_i, y_i)$, and radius, $r_i$; c represents a function relating to a sphere; $(x_n, y_n)$ represents a set of residual image points having image intensities differing from a threshold intensity; $\Lambda_n$ represents an R-disjunction operation; and $V_i$ represents an R-conjunction operation.

14. The system of claim 8 wherein, to identify a void using the void residual, the controller is configured to compute a void according to the equation:

$$\text{Min } E = \Sigma(|d_c|\cdot\hat{}A) - \Sigma(d(\text{find}(d<0))\cdot\hat{}B)$$

where, for a selected model circle having a center and an edge, $d_c$ represents a distance from a residual image point to the center of the model circle and d represents a distance from a residual image point to the edge of the model circle, wherein d is negative in value for a residual image point lying inside the model circle and positive in value for a residual image point lying outside the model circle; and where A and B are selected constants.

15. A non-transitory storage medium having computer executable instructions recorded thereon for identifying voids in solder balls in a ball-grid array (BGA) using an image of the BGA, the computer executable instructions comprising instructions for:
  localizing an image of a solder ball on the BGA image, the solder ball image having a radius and comprising a plurality of points, each point having an image intensity;
  producing a void-free model image of the solder ball based on the radius of the solder ball image, the void-free model image comprising a plurality of points, each point having an image intensity;
  computing a difference between the image intensities of the points of the solder ball image and the image intensities of the points of the void-free model image to produce a residual image, the residual image comprising a plurality of points, each point having an image intensity;
  identifying a void using the residual image; and
  outputting data representing the identified void.

16. The storage medium of claim 15 wherein the computer executable instructions for localizing an image of a solder ball on the BGA image comprise instructions for:
  determining an image maximum intensity and an image minimum intensity of the BGA image;
  identifying image points in the BGA image where a change in an image intensity exceeds a threshold value, the threshold value based on the difference between the image maximum intensity and the image minimum intensity;

selecting a plurality of pairs of identified image points, each pair of image points representing a chord of a substantially circular portion of the BGA image representing a solder ball image;

determining a length of each chord; and determining an estimated center and an estimated radius of the solder ball image based on the chord having the greatest length.

17. The storage medium of claim 16 further comprising computer executable instructions for:

identifying a plurality of chords, each chord having a center point located at a distance less than a threshold distance from the center point of the chord having the greatest length, wherein the threshold distance is a percentage of the estimated radius;

determining a center of the solder ball image based on the center points of the identified plurality of chords; and determining a radius of the solder ball image based on the determined center of the solder ball image.

18. The storage medium of claim 15 wherein the BGA image is produced by X-ray imaging and the computer executable instructions for producing a void-free model image of the solder ball based on the estimated radius of the solder ball image comprise instructions for computing a void-free model image according to the equation:

$$I/I_o = e^{-\lambda x}$$

where $I_o$ represents the original intensity of the X-ray radiation; I represents the attenuated intensity of the X-ray radiation; $\lambda$ represents an X-ray linear attenuation coefficient based on a material of the solder ball; and x represents the distance traveled by the X-ray radiation through the solder ball.

19. The storage medium of claim 15 wherein the computer executable instructions for identifying a void based on the residual image comprise instructions for computing a void according to the equation:

$$\text{Min } \Sigma A_i, \text{ subject to: } [\bigwedge_n \bigvee_i c(x_i, y_i, x_n, y_n, r_i) < 0] > 0$$

where $A_i$ represents the area of a circle, i, represented by center, $(x_i, y_i)$, and radius, $r_i$; c represents a function relating to a sphere; $(x_n, y_n)$ represents a set of residual image points having image intensities differing from a threshold intensity; ∧ represents an R-disjunction operation; and ∨ represents an R-conjunction operation.

20. The storage medium of claim 15 wherein the computer executable instructions for identifying a void based on the residual image comprise instructions for computing a void according to the equation:

$$\text{Min } E = \Sigma(|d_c| \cdot \hat{} A) - \Sigma(d(\text{find}(d<0)) \cdot \hat{} B)$$

where, for a selected model circle having a center and an edge, $d_c$ represents a distance from a residual image point to the center of the model circle and d represents a distance from a residual image point to the edge of the model circle, wherein d is negative in value for a residual image point lying inside the model circle and positive in value for a residual image point lying outside the model circle; and where A and B are selected constants.

* * * * *

UNITED STATES PATENT AND TRADEMARK OFFICE
CERTIFICATE OF CORRECTION

PATENT NO. : 8,306,311 B2  Page 1 of 1
APPLICATION NO. : 12/759960
DATED : November 6, 2012
INVENTOR(S) : McElfresh et al.

It is certified that error appears in the above-identified patent and that said Letters Patent is hereby corrected as shown below:

In column 6, line 46, delete "filed" and insert -- field --, therefor.

In column 6, line 56, delete "$V_{Fraction}=V_{Area} Ball_{Area}$," and insert -- $V_{Fraction}=V_{Area} \div Ball_{Area}$, --, therefor.

In column 9, line 29, delete "$\hat{n}$" and insert -- $_n$ --, therefor.

In column 14, line 15, in Claim 19, delete "represents" and insert -- $_n$ represents --, therefor.

In column 14, line 15, in Claim 19, delete "Vrepresents" and insert -- $V_i$ represents --, therefor.

Signed and Sealed this
Fifth Day of February, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,306,311 B2
APPLICATION NO. : 12/759960
DATED : November 6, 2012
INVENTOR(S) : David K. McElfresh et al.

It is certified that error appears in the above-identified patent and that said Letters Patent is hereby corrected as shown below:

Column 14, Line 14, Claim 19:

After "threshold intensity;"
Delete "$\Lambda$represents" and
Insert -- $\Lambda_n$ represents --.

Column 14, Line 14, Claim 19:

After "R-disjunction operation; and"
Delete " $v$represents" and
Insert -- $v_i$ represents --.

Signed and Sealed this
Nineteenth Day of February, 2013

Teresa Stanek Rea
*Acting Director of the United States Patent and Trademark Office*